US009006573B2

(12) United States Patent
Bendel et al.

(10) Patent No.: US 9,006,573 B2
(45) Date of Patent: Apr. 14, 2015

(54) MOTOR VEHICLE LOCK COMPOSED OF MECHANICAL AND ELECTRICAL, ELECTROMOTIVE AND/OR ELECTRONIC COMPONENTS

(75) Inventors: Thorsten Bendel, Oberhausen (DE); Karsten Barth, Hattingen (DE); Serkan Gülkan, Hattingen (DE); Ulrich Weichsel, Duisburg (DE)

(73) Assignee: Kiekert AG, Helligenhaus (DE)

( * ) Notice: Subject to any disclaimer, the term of this patent is extended or adjusted under 35 U.S.C. 154(b) by 546 days.

(21) Appl. No.: 13/381,974

(22) PCT Filed: Jul. 1, 2010

(86) PCT No.: PCT/DE2010/000769
§ 371 (c)(1),
(2), (4) Date: Jan. 2, 2012

(87) PCT Pub. No.: WO2011/000363
PCT Pub. Date: Jan. 6, 2011

(65) Prior Publication Data

US 2012/0111073 A1 May 10, 2012

(30) Foreign Application Priority Data

Jul. 3, 2009 (DE) .................... 20 2009 004 984 U
Jul. 24, 2009 (DE) .................... 20 2009 005 059 U

(51) Int. Cl.
*H02G 3/04* (2006.01)
*H01B 7/08* (2006.01)
*E05B 85/02* (2014.01)
*E05B 81/24* (2014.01)
*E05B 81/54* (2014.01)
*E05B 15/16* (2006.01)

(52) U.S. Cl.
CPC ................ *E05B 85/02* (2013.01); *E05B 81/25* (2013.01); *E05B 2015/1664* (2013.01); *E05B 81/54* (2013.01)

(58) Field of Classification Search
CPC ..... E05Y 2900/50; H01B 7/0838; H02G 3/04
USPC ................................ 174/72 R, 95, 97, 117 F
See application file for complete search history.

(56) References Cited

U.S. PATENT DOCUMENTS 4,297,565 A * 10/1981 Parr ............................ 219/522
6,268,566 B1 * 7/2001 Takiguchi et al. .......... 174/72 A

FOREIGN PATENT DOCUMENTS

DE 20 2006 011 567 U1 11/2006
DE 10 2006 017 830 A1 10/2007

(Continued)

*Primary Examiner* — Chau N Nguyen
(74) *Attorney, Agent, or Firm* — Renner, Otto, Boisselle & Sklar, LLP

(57) ABSTRACT

A motor vehicle lock containing mechanical locking elements and/or latching elements as well as electrical, electromotive, and/or electronic components that interact with the mechanical locking elements and/or latching elements, wherein the electrical, electromotive, and/or electronic components are attached to a part of a housing (10), wherein an electric line attached to the part of the housing (10) is connected to at least one of the electrical, electromotive, and/or electronic components, wherein the electric line comprises a single-strand or multi-strand, flexible cable, wherein a cable path (19*a*, 19*b*) of the cable (8) passes through a cable conduit (15) disposed in the part of the housing (10), wherein the cable conduit (15) comprises a permanently, plastically-deformed material, at least at one side of the cable path (19*a*, 19*b*), whereby a deformation (V) in the material immobilizes the cable (8) in the cable conduit (15).

15 Claims, 3 Drawing Sheets

(56) References Cited

FOREIGN PATENT DOCUMENTS

| | | | |
|---|---|---|---|
| EP | 1 039 581 | A2 | 9/2000 |
| FR | 2 806 249 | A1 | 9/2001 |
| GB | 2 275 578 | A | 8/1994 |

* cited by examiner

MOTOR VEHICLE LOCK COMPOSED OF MECHANICAL AND ELECTRICAL, ELECTROMOTIVE AND/OR ELECTRONIC COMPONENTS

CROSS-REFERENCE TO RELATED APPLICATIONS

This is a National Stage Application of International Patent Application No. PCT/DE2010/000769, with an international filing date of Jul. 1, 2010, which is based on German Patent Application No. 20 2009 004 984.1, filed Jul. 3, 2009 and on German Patent Application No. 20 2009 005 059.9 filed Jul. 24, 2009.

BACKGROUND OF THE INVENTION

1. Field of the Invention

The invention relates to a motor vehicle lock comprising: mechanical locking and/or latching elements, and electrical, electromotive, and/or electronic components interacting therewith, which components are attached to a part of the housing of the motor vehicle lock, wherein an electric line attached to the housing part leads to at least one of the electrical, electromotive, and/or electronic components.

2. Brief Description of the Related Art

Motor vehicle locks having these characteristics are known from DE 10 2006 017 830 A1 and DE 20 2005 015 588 U1. These publications describe component carriers that are integrated into parts of the housing of the motor vehicle lock, that are provided with conducting path assemblies and that are equipped with electrical, electronic, and/or electromotive structural elements or components. Examples of such components are connectors, micro switches, sensors, motors, etc., which are used in door lock units of a motor vehicle. Electrical connections are provided by conducting path assemblies essentially consisting of multi-strand conducting paths, which are encapsulated to form a module made of plastic and are in this way embedded into parts of the lock housing. For the attachment of electrical, electronic, and electromotive components, the module can be equipped with separate mountings formed during injection molding of the module. The conducting path assemblies that are integrated into parts of the motor vehicle lock provide relatively stiff or rigid component carriers that ensure safe positioning of the components relative to the motor vehicle lock as well as securing the electrical connection.

Although the conducting paths integrated into the housing lead to a reliable electrical connection, the manufacturing costs associated with the production of the conducting paths are no longer justifiable when long distances to remotely disposed electrical, electromotive, or electronic components are to be bridged. An extension of the component carriers, including the conducting paths to such remotely disposed regions, can lead to such high manufacturing costs during mass production that they are no longer acceptable.

BRIEF DESCRIPTION OF THE INVENTION

The aim of the invention is, therefore, to provide a technologically simple and inexpensive installation of electrical connections that span longer distances within a motor vehicle lock.

As a solution, provided is a motor vehicle lock with the above-described features, an electric line comprising a flexible single-core or multi-core cable, which runs through a cable conduit disposed in a part of the housing, wherein the cable conduit comprises permanently plastically-deformed material at least on one side of the cable path, which due to its deformation immobilizes the cable in the cable conduit.

Such an electrical connection is both technologically simple and inexpensive in a motor vehicle lock, especially when larger distances are to be spanned within the motor vehicle lock. The electrical connection may be either a power connection, e.g., to provide power to an electric motor for locking and unlocking the motor vehicle lock, or a signal connection, or a data control connection, e.g., to sensors, electronic controllers, or micro switches of the motor vehicle lock. Providing an operative width of the cable conduit at the site of the deformation that is smaller compared to the rest of the cable conduit, and particularly smaller than the diameter of the cable, ensures a sufficiently secure fixing of the electrical cable along the cable path without the risk that the cable can fall out of the cable conduit, e.g., as a result of vibrations of the door lock.

In a preferred embodiment, the cable path is bounded at one side by a wall of the cable conduit that is preferably sunk into a part of the housing and at the other side by pins that are deformed. The pins are formed at the bottom of the cable conduit and extend perpendicular to the longitudinal direction of the cable.

In a class of this embodiment, the pins are longitudinally compressed and clamp the cable against a wall of the cable conduit.

In another class of this embodiment, the pins are longitudinally compressed only along the length of their head regions. This results in the enlargement of the diameter of the pins in the head regions, which is coupled with a reduction of the operative width of the cable conduit, i.e., the length of the aperture of the cable conduit toward the exterior. In this class of this embodiment, the cable is also prevented from escaping the cable conduit and from leaving the established cable path.

According to another embodiment of the invention, the front surface of the pins coincides with the external surface of the part of the housing surrounding the cable conduit through which the cable passes.

According to a further embodiment of the invention, one cable path runs on one side of the pins and another cable path runs on another side of the pins. The pins can be either of circular cross-sections, or they have elongated cross-sections stretching parallel to the cable path.

BRIEF DESCRIPTION OF THE DRAWINGS

Further advantages and embodiments of the invention will become apparent from the following description of exemplary embodiments which are shown in the drawings, in which.

DETAILED DESCRIPTION OF THE INVENTION

Figure 1:
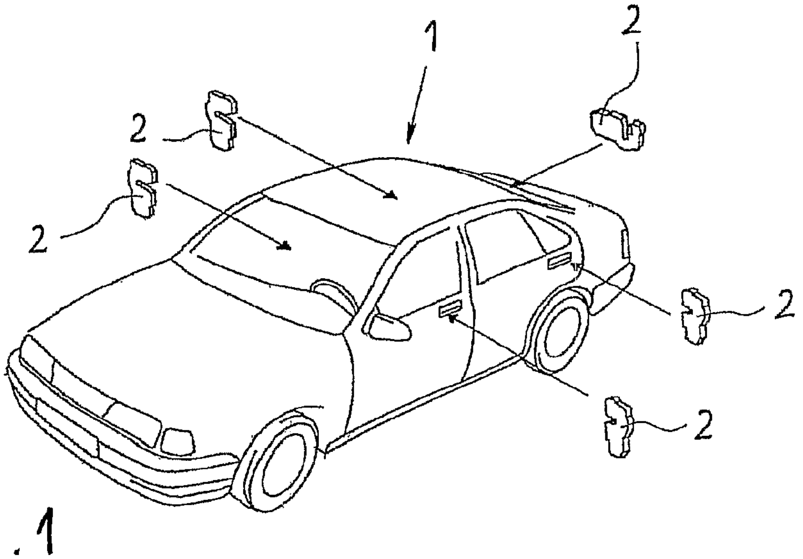
FIG. 1 shows a motor vehicle with markings of positions on the vehicle body intended for installation of certain embodiments of the inventive motor vehicle locks.

FIG. 1 shows that the motor vehicle locks 2 of the invention, which comprise the obligatory locking elements and/or latching elements as well as electrical, electromotive and electronic components interacting therewith, can be deployed at various positions of the motor vehicle 1. Particularly, it is possible to adapt the motor vehicle locks 2 with only a small logistical effort to carry out functions required in a motor vehicle lock and to arrange the motor vehicle locks 2 within the motor vehicle 1.

Figure 2:
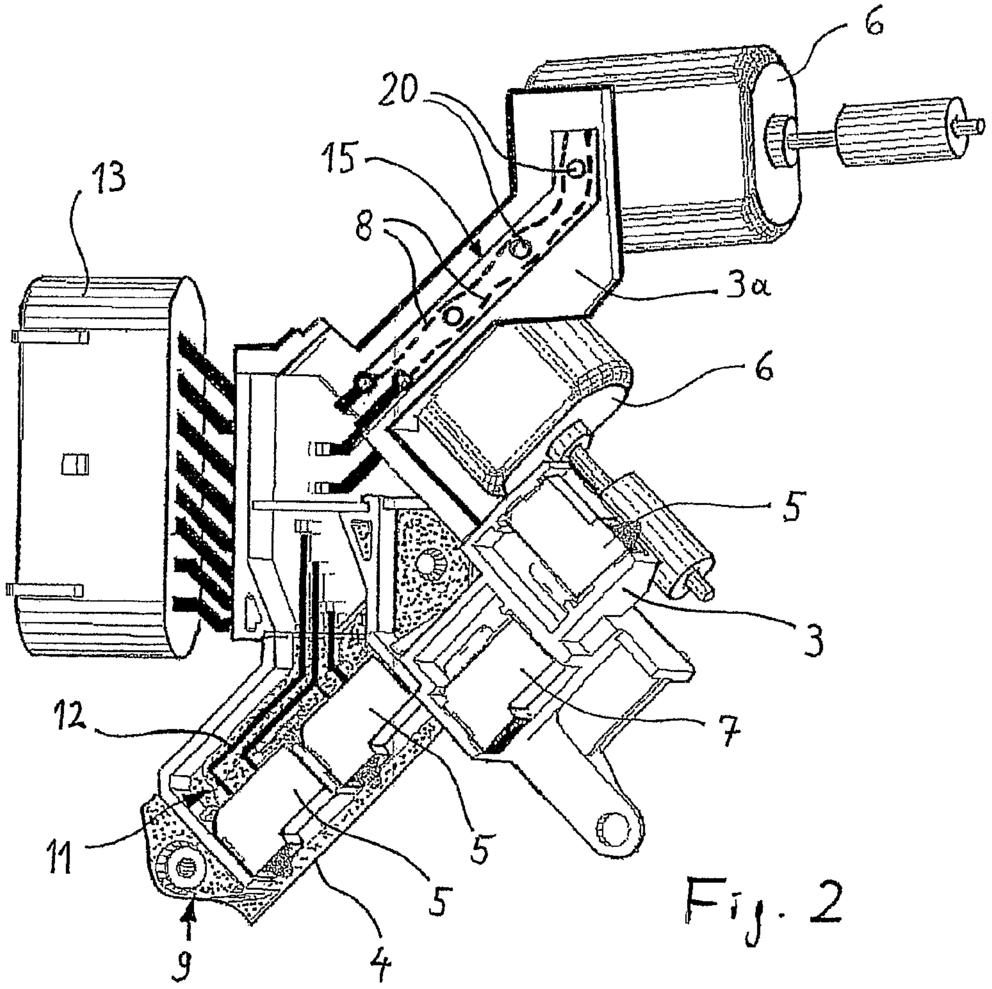
FIG. 2 shows a view of one embodiment of a multi-part component carrier, which is part of the motor vehicle lock.

FIG. 2 shows schematically a device for carrying electrical, electromotive, and electronic components, which device is part of the motor vehicle lock. The various mechanical components and assemblies of the motor vehicle lock are not shown here. On the left side of the figure is shown a connector 13, e.g., a plug. Electrical connections originate at the connector 13, branch out in part, and run to one or more component carriers. A first component carrier 3 is made of plastic and has connections and mounts for an electrical component 5, which, in this embodiment, is a micro switch. In addition, the first component carrier 3 is provided with an electronic component 7 in the form of a microprocessor.

A relatively long arm 3*a* extends from the first component carrier 3. To the end portion of the arm 3*a* is attached an electromotive component 6. This arrangement allows for the electromotive component 6 to be relatively far removed from the other components of the device. In this embodiment, the electromotive component 6 is an electric motor.

The lower portion of FIG. 2 shows a second component carrier 4 (surface dotted for easy recognition). The second component carrier 4 supports also two electrical components 5, which components are micro switches. The electrical components 5 of the second component carrier 4 are contacted by means of conducting paths 12 which are connected to the conducting paths of the first component carrier. The conducting paths 12 are positioned in a recess 11 that extends from the second component carrier 4 to the first component carrier 3. The recess 11 may be sealed with a filler to protect the conducting paths 12 from moisture.

To supply power to the electric motor 6 disposed at the end of the arm 3*a*, an electric line comprising two electric cables 8 extends along the arm 3*a* to the contact terminals of the electric motor 6. Because of the length of the arm 3*a* and, hence, the distance of the electrical connection to be bridged, this electric line is not designed as a conducting path and is not a printed or embedded part of the component carrier but instead is run as a conventional, single-strand or multi-strand cable 8. The guiding and fixing of the cable 8 is explained below with reference to further drawings.

Figure 3:
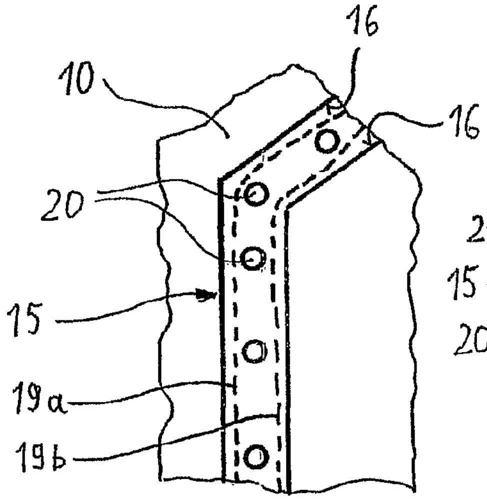
FIG. 3 shows a plan view of a cable conduit having two cable pathways.

FIG. 3 shows a plan view of a cable conduit 15 for the electric cable 8, which conduit 15 is formed in a part of the housing 10 made of plastic. The cable conduit 15 can be formed in any desired portion of the housing of the motor vehicle lock. This housing part 10 may be either the component carrier or a part of the component carrier, e.g., the arm 3*a* shown in FIG. 2. However, the housing part 10 may also be a part of the lock housing itself, or a plastic housing lid of the motor vehicle lock.

The cable conduit 15, which is open to the outside, primarily has a rectangular cross section, comprising a base 17 and two walls of 16. On the base 17 of the cable carrier are integrally formed pins 20 in the shape of studs. In this exemplary embodiment, the pins or rods 20 are disposed in the middle of the cable conduit 15 and are arranged in a row, one next to the other, such that the row follows any bends of the cable conduit 15, as shown in FIG. 3.

Figure 4:
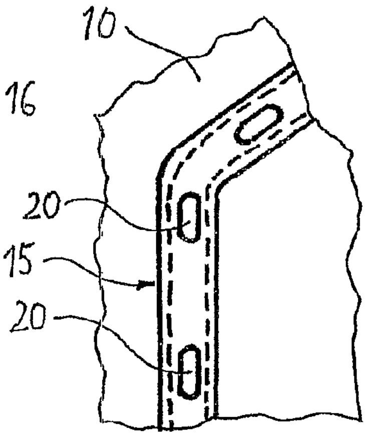
FIG. 4 shows a variant of the cable conduit.

In the embodiment shown in FIG. 3, the pins 20 are respectively rod-shaped, i.e., have a circular cross section, whereas in another embodiment, shown in FIG. 4, the pins 20 have an oblong cross section extending parallel to the cable conduit 15.

Dashed lines in FIGS. 3 and 4 show the first cable path 19*a* and the second cable path 19*b*. The first cable path 19*a* is located between the left wall 16 of the cable conduit and the pins 20, while the other cable path 19*b* is located between the right wall 16 of the cable conduit and the pins 20.

Figure 5A:
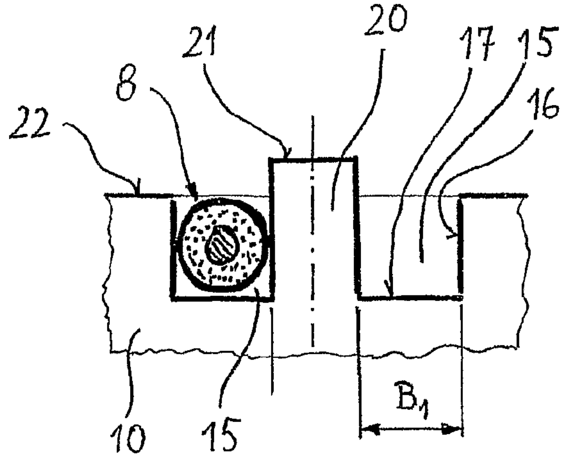
FIG. 5*a* shows a cross-section of the cable conduit with an electric cable placed therein, but before the cable is fixed.

FIG. 5*a* shows a cross section through the housing part 10 in the vicinity of the cable conduit 15, wherein an electric cable 8 comprising an electric wire and electric insulation is disposed in the cable conduit 15 along the cable path 19*a*. The other cable path 19*b* can also be fitted with a single-strand or multi-strand electric cable, but is shown as empty in this figure.

As shown in FIG. 5*a*, the pin 20 is originally of such a length that its front surface 21 extends above the plane of the external surface 22 of the part of the housing 10 that surrounds the cable conduit 15; however, even though the cable 8 is inserted in the cable conduit 15 along the cable path, as shown FIG. 5*a*, it is not securely fixed therein.

Figure 5B:
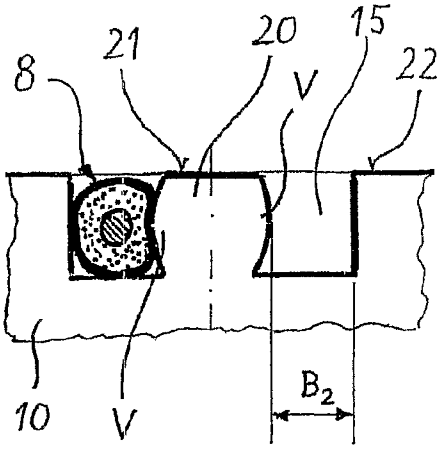
FIG. 5*b* shows the cable conduit of FIG. 5*a* after fixation of the electric cable placed therein by means of clamping.

In order to fix the cable 8, the respective cable conduit is narrowed in sections. This is done by introducing a deformation V of the pin 20 along its entire length, resulting in a widening of the pin, whereby the cable 8 is clamped between the widened pin 20 and the non-deformed wall 16 of the cable conduit. This situation is shown in FIG. 5*b*. Compression of the pin 20 by compressive forces acting on the front surface 21 reduces the length of the pin 20 as the pin 20 widens due to a plastic behavior of the pin's material such that the width $B_2$ of the cable path is much smaller after the compression than the initial width $B_1$. In particular, the width $B_2$ of the cable path is smaller after the compression than the width of the cable 8.

The pin 20 is compressed in the direction of its longitudinal axis until its front surface 21 is even with the plane of the outer surface 22 of the housing portion 10 that surrounds the cable conduit 15. The compression is therefore preferably imparted with a tool having an enlarged tool surface which contacts both with the front surface 21 as well as, in the same plane, the outer surface 22. As soon as the tool surface abuts the outer surface 22, the compression process is completed. To support the permanent plastic deformation of the plastic material of the pin 20, the distortion is preferably performed under simultaneous heating of the pin such that the pin retains its expanded form after it is cooled.

Figure 6A:
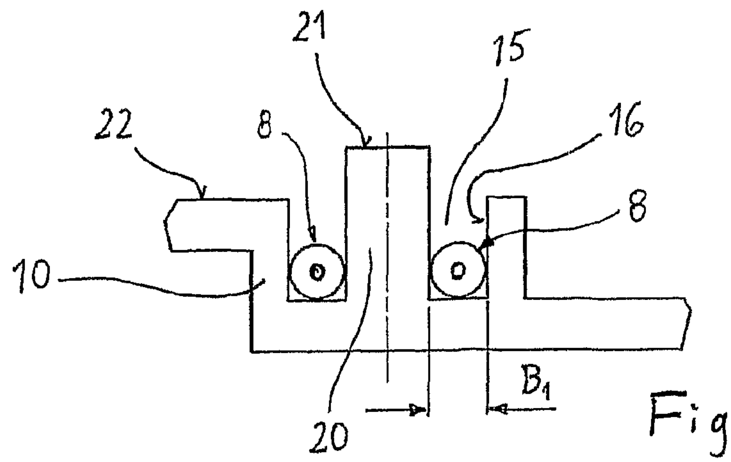
FIG. 6*a* shows a cross-section of an alternative cable conduit with an electric cable placed therein, but before the cable is fixed.
Figure 6B:
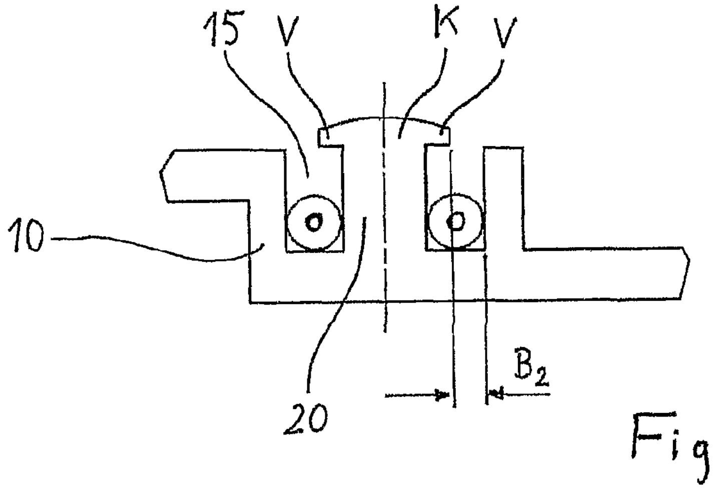
FIG. 6*b* shows the cable conduit of FIG. 6*a* after the electric cable placed therein has been secured such that it can no longer leave the cable conduit.

In the alternative embodiment shown in FIGS. 6*a* and 6*b*, the deformation V of the pin 20 does not occur over its entire height but only in the head region K, as shown comparatively in FIG. 6*a* (prior to the deformation) and FIG. 6*b* (after the deformation). As the longitudinal compression occurs only in a section of the pin material, the head region K expands on both sides to form a mushroom-shaped head. The consequence of this expansion is that the cable conduit 15 has a reduced width $B_2$ in the area of the deformation V relative to the remaining width $B_1$. The reduced width $B_2$ is smaller than the thickness of the cable 8, including its insulation, ensuring that the cable 8 cannot leave the intended cable path and escape from the cable conduit 15.

As shown in the embodiment of FIGS. 6*a* and 6*b*, to support the permanent plastic deformation of the pin 20 in its head region, the deformation occurs preferably with simultaneous supply of heat, preferably by means of a deformation tool. The typical mushroom shape of the pin cross section is, therefore, permanently maintained even after the pin has cooled.

As shown in the embodiment shown in FIGS. 6*a* and 6*b*, the pins 20 may be either cylindrical, i.e., of circular cross-section, or they may have an oblong cross section stretching longitudinally parallel to the cable conduit 15.

REFERENCE LIST

1. Motor vehicle
2. Motor vehicle lock
3. Component carrier
3*a*. Arm
4. Component carrier
5. Electrical component
6. Electromotive component
7. Electronic component
8. Cable
9. Periphery
10. Body part
11. Recess
12. Conducting path
13. Connecting means
15. Cable conduit
16. Wall
17. Base
19*a*. Cable path
19*b*. Cable path
20. Pin
21. Front surface
22. Outer surface
$B_1$. Width
$B_2$. Width
K. Head region
V. Deformation

The invention claimed is:

1. A motor vehicle lock, comprising: mechanical locking elements and/or latching elements as well as electrical, electromotive, and/or electronic components that interact with said mechanical locking elements and/or latching elements, wherein said electrical, electromotive, and/or electronic components are attached to a part of a housing, wherein an electric line attached to said part of said housing is connected to at least one of said electrical, electromotive, and/or electronic components, wherein said electric line comprises a single-strand or multi-strand, flexible cable, wherein a cable path of said cable passes through a cable conduit disposed in said part of said housing, wherein said cable conduit comprises a permanently, plastically-deformed material, at least at one side of said cable path, whereby a deformation in said material is configured to compress said cable in said cable conduit, wherein said cable path is bounded at one side by a wall of said cable conduit and at the other side by pins comprising said deformation, wherein said pins are disposed on a base of said cable conduit and extend in perpendicular to the longitudinal direction of said cable.

2. The vehicle lock of claim 1, wherein said cable conduit has a width in the area of said deformation that is smaller compared to a width of the remaining portion of said cable conduit.

3. The vehicle lock of claim 2, wherein said cable conduit is sunk into said part of said housing.

4. The vehicle lock of claim 2, wherein said pins clamp said cable against said wall as a result of their longitudinal compression.

5. The vehicle lock of claim 1, wherein said cable conduit is sunk into said part of said housing.

6. The vehicle lock of claim 5, wherein said pins clamp said cable against said wall as a result of their longitudinal compression.

7. The vehicle lock of claim 1, wherein said pins clamp said cable against said wall as a result of their longitudinal compression.

8. The vehicle lock of claim 7, wherein a front surface of said pins is even with an outer surface of said housing portion that surrounds said cable conduit.

9. The vehicle lock of claim 1, wherein said pins reduce said width of said cable conduit as a result of their longitudinal compression in their head region.

10. The vehicle lock of claim 9, wherein a front surface of said pins is even with an outer surface of said housing portion that surrounds said cable conduit.

11. The vehicle lock of claim 1, wherein a front surface of said pins is even with an outer surface of said housing portion that surrounds said cable conduit.

12. The vehicle lock of claim 1, wherein said cable pathway runs on each side of said pins.

13. The vehicle lock of claim 1, wherein said pins have a circular cross-section.

14. The vehicle lock of claim 1, wherein said pins have elongated cross-section mainly extending parallel to said cable path.

15. A motor vehicle lock, comprising: mechanical locking elements and/or latching elements as well as electrical, electromotive, and/or electronic components that interact with said mechanical locking elements and/or latching elements, wherein said electrical, electromotive, and/or electronic components are attached to a part of a housing, wherein an electric line attached to said part of said housing is connected to at least one of said electrical, electromotive, and/or electronic components, wherein said electric line comprises a single-strand or multi-strand, flexible cable, wherein a cable path of said cable passes through a cable conduit disposed in said part of said housing, wherein said cable conduit comprises a permanently, plastically-deformed material, at least at one side of said cable path, whereby a deformation in said material immobilizes said cable in said cable conduit; wherein said cable conduit has a width in the area of said deformation that is smaller compared to a width of the remaining portion of said cable conduit; wherein said cable conduit is sunk into said part of said housing; wherein said cable path is bounded at one side by a wall of said cable conduit and at the other side by pins comprising said deformation, wherein said pins are disposed on a base of said cable conduit and extend in perpendicular to the longitudinal direction of said cable; wherein said pins clamp said cable against said wall as a result of their longitudinal compression; wherein a front surface of said pins is even with an outer surface of said housing portion that surrounds said cable conduit; and wherein said cable pathway runs on each side of said pins.

* * * * *